United States Patent
Sugiyama et al.

(10) Patent No.: US 11,232,789 B2
(45) Date of Patent: Jan. 25, 2022

(54) DIALOGUE ESTABLISHING UTTERANCES WITHOUT CONTENT WORDS

(71) Applicants: NIPPON TELEGRAPH AND TELEPHONE CORPORATION, Chiyoda-ku (JP); OSAKA UNIVERSITY, Suita (JP)

(72) Inventors: Hiroaki Sugiyama, Soraku-gun (JP); Toyomi Meguro, Soraku-gun (JP); Junji Yamato, Soraku-gun (JP); Yuichiro Yoshikawa, Suita (JP); Hiroshi Ishiguro, Suita (JP); Takamasa Iio, Suita (JP); Tsunehiro Arimoto, Suita (JP)

(73) Assignees: NIPPON TELEGRAPH AND TELEPHONE CORPORATION, Chiyoda-ku (JP); OSAKA UNIVERSITY, Suita (JP)

( * ) Notice: Subject to any disclaimer, the term of this patent is extended or adjusted under 35 U.S.C. 154(b) by 140 days.

(21) Appl. No.: 16/301,665

(22) PCT Filed: May 19, 2017

(86) PCT No.: PCT/JP2017/018793
§ 371 (c)(1),
(2) Date: Nov. 14, 2018

(87) PCT Pub. No.: WO2017/200078
PCT Pub. Date: Nov. 23, 2017

(65) Prior Publication Data
US 2019/0304451 A1    Oct. 3, 2019

(30) Foreign Application Priority Data
May 20, 2016    (JP) .............................. JP2016-101224

(51) Int. Cl.
G10L 15/22    (2006.01)
G10L 13/00    (2006.01)
(Continued)

(52) U.S. Cl.
CPC ................. *G10L 15/22* (2013.01); *G06F 3/16* (2013.01); *G10L 13/00* (2013.01); *G10L 15/00* (2013.01); *G10L 2015/223* (2013.01)

(58) Field of Classification Search
CPC ... G10L 15/1815; G10L 15/183; G10L 15/22; G10L 2015/225; B25J 11/0005; B25J 11/0015
(Continued)

(56) References Cited

U.S. PATENT DOCUMENTS 6,434,525 B1 *   8/2002   Nagisa ................... G10L 21/06
                                                              704/260
9,375,845 B1 *   6/2016   Annan .................. B25J 11/0005
(Continued)

FOREIGN PATENT DOCUMENTS

JP    2014-191030 A    10/2014
JP    2016-80981 A     5/2016

OTHER PUBLICATIONS

Arimoto, T. et al., "Impression Evaluation of Dialogue without Voice Recognition by Plural Robots", Conference of the Robotics Society of Japan, Sep. 13, 2015 (with partial translation), 9 pages total.
(Continued)

*Primary Examiner* — Martin Lerner
(74) *Attorney, Agent, or Firm* — Oblon, McClelland, Maier & Neustadt, L.L.P.

(57) ABSTRACT

The present invention keeps a dialogue continuing for a long time without causing uncomfortable feeling to a user. A dialogue system 10 includes at least an input part 1 that
(Continued)

receives a user utterance, which is an utterance from a user and a presentation part 5 that presents the utterance. The input part 1 receives a user utterance performed by the user. A presentation part 5-1 presents a dialogue-establishing utterance which does not include any content words. A presentation part 5-2 presents a second utterance associated with a generation target utterance, which is one or more utterances performed before user utterance that includes at least the user utterance, after the dialogue-establishing utterance.

11 Claims, 3 Drawing Sheets

(51) Int. Cl.
  *G10L 15/00* (2013.01)
  *G06F 3/16* (2006.01)
(58) Field of Classification Search
  USPC .............................. 704/235, 236, 270, 275
  See application file for complete search history.

(56) References Cited

U.S. PATENT DOCUMENTS

| | | | | |
|---|---|---|---|---|
| 9,418,663 | B2* | 8/2016 | Chen | G10L 15/22 |
| 10,872,609 | B2* | 12/2020 | Sugiyama | G10L 15/22 |
| 10,964,323 | B2* | 3/2021 | Sugiyama | G10L 15/22 |
| 2002/0049805 | A1* | 4/2002 | Yamada | G06F 3/167 |
| | | | | 709/202 |
| 2005/0278180 | A1* | 12/2005 | O'Neill | G10L 15/22 |
| | | | | 704/275 |
| 2006/0047362 | A1* | 3/2006 | Aoyama | G10L 15/22 |
| | | | | 700/245 |
| 2007/0239459 | A1* | 10/2007 | Horvitz | G10L 15/22 |
| | | | | 704/275 |
| 2007/0255566 | A1* | 11/2007 | Nguyen | G10L 15/22 |
| | | | | 704/257 |
| 2010/0082345 | A1* | 4/2010 | Wang | G10L 21/06 |
| | | | | 704/260 |
| 2012/0253818 | A1* | 10/2012 | Owada | A63F 13/42 |
| | | | | 704/270 |
| 2012/0265528 | A1* | 10/2012 | Gruber | G10L 15/183 |
| | | | | 704/235 |
| 2015/0019228 | A1* | 1/2015 | Akolkar | G10L 15/22 |
| | | | | 704/270.1 |
| 2015/0039316 | A1* | 2/2015 | Tzirkel-Hancock | |
| | | | | G10L 15/1815 |
| | | | | 704/275 |
| 2015/0340033 | A1* | 11/2015 | Di Fabbrizio | G10L 15/22 |
| | | | | 704/254 |
| 2016/0283465 | A1* | 9/2016 | Patris | G10L 15/22 |
| 2019/0206406 | A1* | 7/2019 | Sugiyama | G10L 15/22 |
| 2019/0294638 | A1* | 9/2019 | Sugiyama | G10L 15/22 |
| 2020/0013403 | A1* | 1/2020 | Sugiyama | G10L 15/22 |
| 2020/0013404 | A1* | 1/2020 | Sugiyama | G10L 15/22 |
| 2020/0027455 | A1* | 1/2020 | Sugiyama | G10L 15/22 |
| 2020/0034434 | A1* | 1/2020 | Sugiyama | G10L 15/22 |

OTHER PUBLICATIONS

Horiuchi, R. et al., "Topic Change in Chat Dialogue System", Proceedings of the 15th Annual Conference of the Association of Natural Language Processing, Mar. 2, 2009, pp. 312-315 (with full translation), 18 total pages.

Kawahara, T., "Toward Dialogue System with Conversational Utterance", Information Processing, IPSJ Magazine, vol. 45, No. 10, pp. 1027-1031, Oct. 2004 (with full translation), 19 total pages.

Sugiyama, H. et al., "Leveraging Dependency Relations and Sentence Examples in Web-scale Corpus for Open-domain Utterance Generation", Transactions of the Japanese Society for Artificial Intelligence, vol. 30, No. 1, pp. 183-194, 2015 (with partial translation), 22 total pages.

Meguro, T. et al., "Building a conversational system based on the fusion of rule-based and stochastic utterance generation", The 28th Annual Conference of the Japanese Society for Artificial Intelligence, 2014, pp. 1-4 (with translation), 8 total pages.

Sugiyama, H., "Chat-oriented Dialogue Breakdown Detection based on Combination of Various Data", pp. 51-56 (with translation), 19 total pages.

International Search Report dated Aug. 8, 2017 in PCT/2017/018793 filed on May 19, 2017.

Japanese Office Action dated Jan. 28, 2020 in Japanese Patent Application No. 2018-518377 (with English translation), 10 pages.

* cited by examiner

DIALOGUE ESTABLISHING UTTERANCES WITHOUT CONTENT WORDS

TECHNICAL FIELD

The present invention relates to a technique for a computer to perform a dialogue with a human using a natural language, which is applicable to a robot or the like communicating with humans.

BACKGROUND ART

In recent years, research and development on robots communicating with humans has been progressing and put to practical use at various scenes. For example, at the site of communication therapy, there is a usage pattern in which a robot serves as a companion to talk with a person feeling loneliness. More specifically, a robot plays a role of a listener to a resident at elder care facilities, and can thereby heal the loneliness of the resident, and also can show the resident having dialogue with the robot to make chances to start dialogue between the resident and people around the resident such as his/her family and nurses. In addition, at the site of communication training, there is a usage pattern in which a robot becomes a training partner. More specifically, the robot becomes a training partner for foreign language learners at foreign language schools, thus helping the foreign language learners to efficiently proceed with foreign language learning. Furthermore, in an application as an information presentation system, robots perform a dialogue with each other and have their dialogue heard by people as a basis, sometimes talk to people, cause the people to join in dialogue without making the people bored, and can thereby present information in a form easily acceptable to the people. More specifically, when people feel bored at a meeting place, a bus stop, a platform at a station or the like in a town or when people can afford to participate in a dialogue at home, a classroom or the like, it is possible to expect efficient presentation of information such as news, merchandise introduction, introduction of a store of information or knowledge, education (for example, nursery and education of children, education in the liberal arts for adult people, moral enlightenment). Furthermore, in an application as an information collection system, there is a usage pattern in which a robot collects information while talking to people. Since it is possible to maintain a feeling of dialogue through communication with the robot, the system can gather information without giving people any feeling of oppression that they are being listened to by a third party. More specifically, the system is expected to be applicable to a personal information survey, a market survey, a merchandise evaluation, a taste investigation for recommended commodity or the like. Thus, a variety of applications are expected from communication between humans and robots, and an implementation of a robot that interacts with users more naturally is expected. With the wide spread of smartphones, chat services such as LINE (registered trademark) are also realized whereby a plurality of users chat with each other substantially in real time, enjoying dialogue among people. By applying a technique of dialogue with robots to this chat service, it is possible to implement a chat service whereby robots can perform dialogues with users more naturally even in the absence of any chat partner.

In the present specification, hardware which becomes a dialogue partner to a user such as robots used in these services or a chat partner, or computer software for causing a computer to function as hardware to become the user's dialogue partner are generically called an "agent." Since the agent is intended to become the user's dialogue partner, the agent may be personified such as a robot or a chat partner, personalized or may possess characters or individuality.

The key to the implementation of these services is a technique that enables the agent implemented by hardware or computer software to perform a dialogue with humans naturally.

An example of such an agent is a spoken dialogue system described in Non-patent literature 1 which performs voice recognition on a user's utterance, understands and infers an intention of the utterance and appropriately responds thereto. Researches on spoken dialogue systems have been actively conducted with the progress of voice recognition techniques, and spoken dialogue systems are being put to practical use in automatic voice response systems or the like.

One example of the above-described agent is a scenario dialogue system that performs a dialogue with a user about a specific topic along a predetermined scenario. The scenario dialogue system allows the dialogue to be continued as long as the dialogue develops along the scenario. For example, a dialogue system described in Non-patent literature 2 is a system that performs a dialogue between the user and a plurality of agents by including an interrupt by an agent or interaction between agents. For example, an agent utters a question provided in the scenario to the user and when the user's utterance of reply to the question corresponds to a choice provided in the scenario, the dialogue system functions so as to perform an utterance corresponding to the choice. That is, the scenario dialogue system is a dialogue system in which the agent performs an utterance based on a scenario stored in advance in the system. In this dialogue system, the agent asks a question to the user, and upon receiving an answer from the user, the agent chimes in with, for example, "I see" irrespective of the utterance contents of the user or changes the topic with an interrupt by the agent, and even when the user's utterance deviates from the original topic, it is possible to respond to the user's utterance without causing the user to feel a failure of the story.

One example of the above-described agent is a chat-oriented dialogue system in which the agent performs an utterance in accordance with the utterance contents of the user so that the user and the agent perform a natural dialogue. For example, a dialogue system described in Non-patent literature 3 is a system that realizes an chat-oriented dialogue between the user and the system by the system performing an utterance while attaching greater importance to words specific to the context in a plurality of turns of dialogue engaged between the user and the agent, using a word included in an utterance of the user or the agent as a trigger and according to a rule described in advance. The rule used in the chat-oriented dialogue system is not limited to one described in advance but may be one automatically generated based on the user's utterance contents or may be one automatically generated based on the immediately preceding utterance by the user or the agent or an utterance performed in the vicinity thereof or may be one automatically generated based on an utterance at least including the immediately preceding utterance by the user or the agent or an utterance performed in the vicinity thereof. Non-patent literature 3 describes a technique for automatically generating a rule based on words in a co-occurrence relation or a dependency relation with words included in the utterance of the user. A dialogue system described, for example, in Non-patent literature 4 is a system whereby a manually described rule and a rule described using a statistical utterance generation technique are merged so as to reduce the rule generation cost. Unlike the scenario dialogue system, the chat-oriented dialogue system is not such a system that an agent performs an utterance along a scenario provided in advance, and so it is possible for the agent to perform an utterance at least based on utterance contents of the user, an immediately preceding utterance by the user or the agent or an utterance performed in the vicinity thereof or an immediately preceding utterance by the user or the agent or an utterance performed in the vicinity thereof without causing a situation in which the utterance by the agent does not correspond to the user's utterance depending on the user's utterance. That is, the chat-oriented dialogue system is a dialogue system in which the agent performs an utterance at least based on utterance contents of the user, an immediately preceding utterance by the user or the agent or an utterance performed in the vicinity thereof or an immediately preceding utterance by the user or the agent or an utterance performed in the vicinity thereof. These chat-oriented dialogue systems can explicitly respond to the user's utterance.

PRIOR ART LITERATURE

Non-Patent Literature

Non-patent literature 1: Tatsuya Kawahara, "Toward Dialogue System with Conversational Utterance," Information Processing, vol. 45, no. 10, pp. 1027-1031, October 2004

Non-patent literature 2: Tsunehiro Arimoto, Yuichiro Yoshikawa, Hiroshi Ishiguro, "Impression Evaluation of Dialogue without Voice Recognition by Plural Robots," Conference of the Robotics Society of Japan, 2016

Non-patent literature 3: Hiroaki Sugiyama, Toyomi Meguro, Ryuichiro Higashinaka, Yasuhiro Minami, "Leveraging Dependency Relations and Sentence Examples in Webscale Corpus for Open-domain Utterance Generation," Transactions of the Japanese Society for Artificial Intelligence, vol. 30(1), pp. 183-194, 2015

Non-patent literature 4: Toyomi Meguro, Hiroaki Sugiyama, Ryuichiro Higashinaka, and Yasuhiro Minami, "Building a conversational system based on the fusion of rule-based and stochastic utterance generation," Proceedings of the 28$^{th}$ Annual Conference of the Japanese Society for Artificial Intelligence, vol. 28, pp. 1-4, 2014

SUMMARY OF THE INVENTION

Problems to be Solved by the Invention

However, since the user performs a wide variety of complicated utterances, it is difficult for a conventional spoken dialogue system to accurately understand meanings and contents of all of user's utterances. If the spoken dialogue system cannot accurately understand the user's utterance, it cannot give an appropriate response to the user's utterance. In a situation in which the user and the spoken dialogue system perform a dialogue face to face, if the spoken dialogue system cannot give an appropriate response, the user may feel stress in continuing the dialogue, which may result in suspension of the dialogue or a dialogue failure.

In view of the above-described points, it is an object of the present invention to provide a dialogue technique which will not give a user any uncomfortable feeling even when it is not possible to generate any appropriate utterance in response to the user's utterance.

Means to Solve the Problems

In order to solve the above-described problems, a dialogue method according to a first aspect of the present invention is a dialogue method carried out by a dialogue system that performs a dialogue with a user, the dialogue method comprising an utterance receiving step in which an input part receives a user utterance performed by the user, a first presentation step in which a presentation part presents a dialogue-establishing utterance which does not include content words, and a second presentation step in which the presentation part presents, after the dialogue-establishing utterance, a second utterance which is an utterance associated with a generation target utterance which is one or more utterances performed before the user utterance including at least the user utterance.

A dialogue method according to a second aspect of the present invention is a dialogue method carried out by a dialogue system that performs a dialogue with a user, the dialogue method comprising an utterance receiving step in which an input part receives a user utterance performed by the user, a first presentation step in which a presentation part presents a dialogue-establishing utterance which includes part of the user utterance or a hypernym thereof, and a second presentation step in which the presentation part presents, after the dialogue-establishing utterance, a second utterance which is an utterance associated with a generation target utterance which is one or more utterances performed before the user utterance including at least the user utterance.

A dialogue method according to a third aspect of the present invention is a dialogue method carried out by a dialogue system that performs a dialogue with a user, the dialogue system comprising a first agent and a second agent, the dialogue method comprising an utterance receiving step in which an input part receives a user utterance performed by the user in response to an utterance of the first agent and a presentation step in which a presentation part presents an utterance associated with a generation target utterance which is one or more utterances performed before the user utterance including at least the user utterance as an utterance of the second agent.

A dialogue system according to a fourth aspect of the present invention is a dialogue system that performs a dialogue with a user, the dialogue system comprising an input part that receives a user utterance performed by the user, an utterance determination part that determines a dialogue-establishing utterance which is an utterance that does not include content words and a second utterance which is an utterance associated with a generation target utterance which is one or more utterances performed before the user utterance including at least the user utterance, and a presentation part that presents the dialogue-establishing utterance determined by the utterance determination part and presents the second utterance determined by the utterance determination part after presenting the dialogue-establishing utterance.

A dialogue system according to a fifth aspect of the present invention is a dialogue system that performs a dialogue with a user, the dialogue system comprising an input part that receives a user utterance performed by the user, an utterance determination part that determines a dialogue-establishing utterance which is an utterance that includes part of the user utterance or a hypernym thereof and a second utterance which is an utterance associated with a generation target utterance which is one or more utterances performed before the user utterance including at least the user utterance, and a presentation part that presents the dialogue-establishing utterance determined by the utterance determination part and presents the second utterance determined by the utterance determination part after presenting the dialogue-establishing utterance.

A dialogue system according to a sixth aspect of the present invention is a dialogue system that performs a dialogue with a user, the dialogue system comprising an input part that receives a user utterance performed by the user in response to a first agent, an utterance determination part that determines an utterance associated with a generation target utterance which is one or more utterances performed before the user utterance including at least the user utterance, and a presentation part in which a second agent presents the utterance determined by the utterance determination part.

A dialogue apparatus according to a seventh aspect of the present invention is a dialogue apparatus that determines an utterance presented by a dialogue system comprising at least an input part that receives a user utterance which is an utterance from a user and a presentation part that presents an utterance, the dialogue apparatus comprising an utterance determination part that determines a dialogue-establishing utterance which is an utterance that does not include content words and a second utterance which is an utterance presented after the dialogue-establishing utterance and is a one or more utterances performed before the user utterance including at least the user utterance.

A dialogue apparatus according to an eighth aspect of the present invention is a dialogue apparatus that determines an utterance presented by a dialogue system comprising at least an input part that receives a user utterance which is an utterance from a user and a presentation part that presents an utterance, the dialogue apparatus comprising an utterance determination part that determines a dialogue-establishing utterance which is an utterance that includes part of the user utterance or a hypernym thereof and a second utterance which is an utterance presented after the dialogue-establishing utterance and which is an utterance associated with a generation target utterance which is one or more utterances performed before the user utterance including at least the user utterance.

A dialogue apparatus according to a ninth aspect of the present invention is a dialogue apparatus that determines an utterance presented by a dialogue system comprising at least an input part that receives a user utterance which is an utterance from a user and a presentation part that presents an utterance through a first agent and a second agent, the dialogue apparatus comprising an utterance determination part that determines a second utterance as an utterance of the second agent which is an utterance associated with a generation target utterance which is one or more utterances performed before the user utterance including at least the user utterance when the user utterance is performed in response to an utterance of the first agent.

Effects of the Invention

According to the present invention, it is possible to implement a dialogue system and a dialogue apparatus capable of always establishing an utterance, reducing uncomfortable feeling given to a user and continuing a dialogue with the user for a long time by presenting an utterance that establishes a dialogue in response to any utterance, utterance not including content words (hereinafter also referred to as a "dialogue-establishing utterance") such as nodding (e.g., "I see," "Wow!") and fillers (e.g., "Uh," "Umm," "Well") even when it is not possible to generate any appropriate utterance in response to a user's utterance.

DETAILED DESCRIPTION OF THE EMBODIMENTS

Hereinafter, embodiments of the present invention will be described in detail. Note that components having identical functions in the drawings are assigned identical reference numerals and overlapping description will be omitted.

Figure 1:
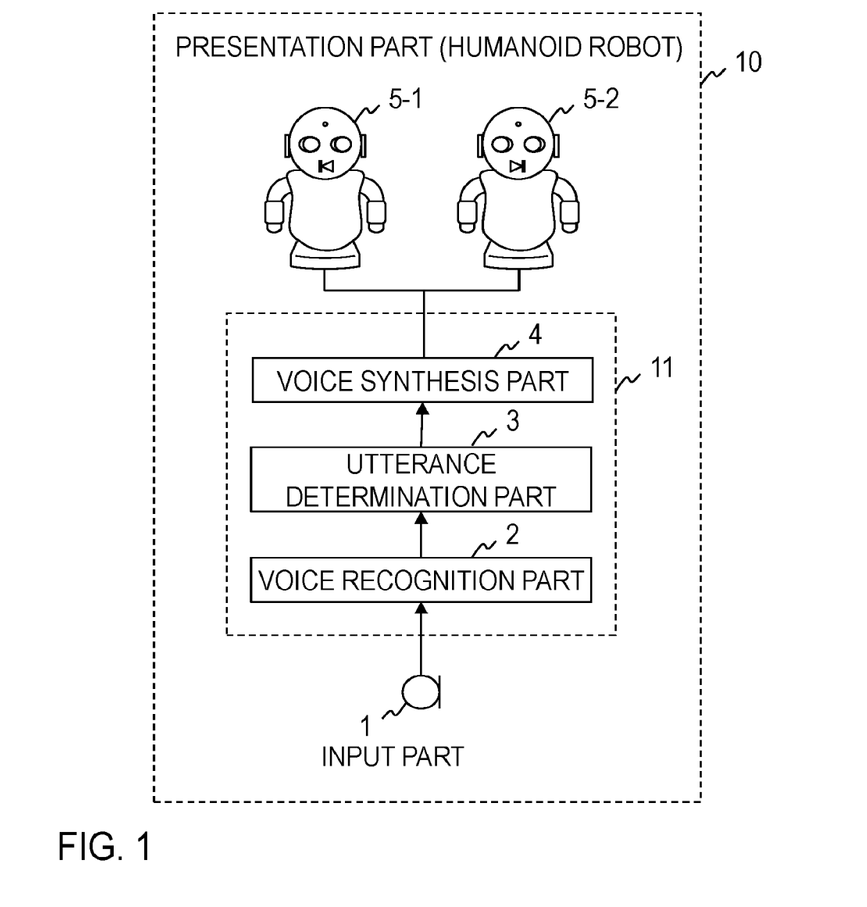
FIG. 1 is a diagram illustrating a functional configuration of a dialogue system using a humanoid robot.

A dialogue system according to an embodiment is a system in which a plurality of humanoid robots cooperate to perform a dialogue with a user. As shown in FIG. 1, a dialogue system 10 is provided with an input part 1, a voice recognition part 2, an utterance determination part 3, a voice synthesis part 4 and a presentation part 5. This dialogue system performs a process in each step which will be described later, and thereby implements a dialogue method of the embodiment. Note that as shown in FIG. 1, a block composed of the voice recognition part 2, the utterance determination part 3 and the voice synthesis part 4 of the dialogue system 10 is referred to as a dialogue apparatus 11.

Since the user performs a wide variety of complicated utterances in a dialogue, it is difficult for the dialogue system to always generate an appropriate response to the user's utterances. If a dialogue system cannot give an appropriate response, this will give the user an uncomfortable feeling, which may result in a dialogue failure. Therefore, in the embodiment, to avoid a dialogue failure, the dialogue system performs an utterance such that a dialogue is always established after the user performs an utterance, and the dialogue is thereby always established. Examples of such an utterance include an utterance which does not include content words such as nodding (e.g., "I see," "Wow!") and fillers (e.g., "Uh," "Umm," "Well"). Hereinafter, such utterances that establish a dialogue in response to any type of utterance are called a "dialogue-establishing utterance."

However, if the dialogue system continues only nodding in response to the user's utterance, the dialogue does not progress, which may cause the user to feel bored and may cause the user to suspend the dialogue. Thus, after the dialogue-establishing utterance, the dialogue system performs a second utterance relating to a whole or part of the user's utterance and continues with the dialogue. By so doing, it can be expected that an uncomfortable feeling given to the user will be lessened even if it is not possible to give appropriate responses to all utterances.

In the dialogue system to perform a dialogue between the user and a plurality of agents, the dialogue-establishing utterance and the second utterance that follows the dialogue-establishing utterance may be performed by one agent or may be shared among a plurality of agents. To be noted that, sharing the utterances among the plurality of agents is believed to be able to reduce the uncomfortable feeling of the user more. This is because even if the contents of the second utterance do not meet the intention of the user's utterance, the user is allowed to feel that at least the agent that has performed the dialogue-establishing utterance understands the user's utterance.

The dialogue apparatus 11 is a special apparatus configured such that a special program is read into a known or special purpose computer provided with a central processing unit (CPU), a main storage apparatus (RANI: random access memory) or the like. The dialogue apparatus 11 executes each process under the control of the central processing unit. Data inputted to the dialogue apparatus 11 or data obtained through each process is stored, for example, in the main storage apparatus and the data stored in the main storage apparatus is read as needed and used for other processes. At least part of each processing part of the dialogue apparatus 11 may also be constructed of hardware such as an integrated circuit.

The input part 1 is an interface for the dialogue system 10 to acquire the user's utterance. In other words, the input part 1 is an interface for the user to input utterances to the dialogue system 10. For example, the input part 1 is a microphone that collects the user's utterance voice to convert it to a voice signal. The input part 1 inputs the voice signal of the user's collected utterance voice to the voice recognition part 2.

The voice recognition part 2 converts the voice signal of the user's utterance voice collected by the input part 1 to a text expressing utterance contents of the user. The voice recognition part 2 inputs the text expressing the utterance contents of the user to the utterance determination part 3. As the voice recognition method, any existing voice recognition technique may be used and an optimum one may be selected as appropriate in accordance with the use environment or the like.

The utterance determination part 3 determines the text expressing utterance contents from the dialogue system 10 based on the inputted text expressing the utterance contents of the user. The utterance determination part 3 inputs the determined text expressing the utterance contents to the voice synthesis part 4.

The voice synthesis part 4 converts the text expressing the utterance contents determined by the utterance determination part 3 to a voice signal expressing the utterance contents. The voice synthesis part 4 inputs the voice signal expressing the utterance contents to the presentation part 5. As the voice synthesis method, any existing voice synthesis technique may be used or an optimum one may be selected as appropriate in accordance with the use environment or the like.

The presentation part 5 is an interface to present the utterance contents determined by the utterance determination part 3 to the user. For example, the presentation part 5 is a humanoid robot manufactured in imitation of a human figure. The humanoid robot pronounces the voice signal expressing the utterance contents of the text expressing the utterance contents determined by the utterance determination part 3 converted by the voice synthesis part 4 to the voice signal from, for example, a speaker mounted on the head. That is, the presentation part 5 presents an utterance. When the presentation part 5 is assumed to be a humanoid robot, one humanoid robot is provided for each personality participating in the dialogue. Hereinafter, as an example of two personalities participating in the dialogue, suppose there are two humanoid robots 5-1 and 5-2.

The input part 1 may be configured to be integrated with the presentation part 5. For example, when a humanoid robot is used for the presentation part 5, a microphone may be mounted on the head of the humanoid robot to be used as the input part 1.

Figure 2:
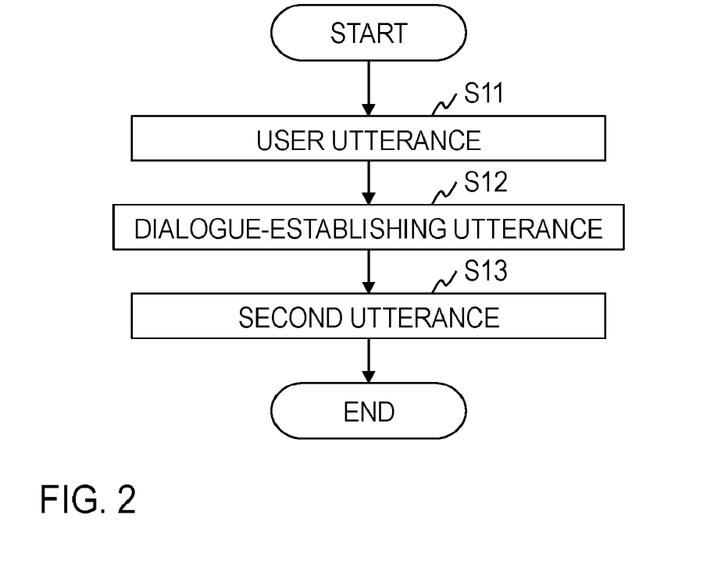
FIG. 2 is a diagram illustrating a processing procedure of a dialogue method.

Hereinafter, a processing procedure for the dialogue method according to the embodiment will be described with reference to FIG. 2.

In step S11, the microphone 1 receives an utterance performed by the user. Hereinafter, this utterance is called a "user utterance." The voice recognition part 2 performs voice recognition on the voice signal of the user utterance collected by the microphone 1 and inputs the text obtained as the voice recognition result to the utterance determination part 3 as the text expressing contents of the user utterance.

In step S12, the humanoid robot 5-1 outputs a voice expressing contents of a dialogue-establishing utterance from the speaker. The "dialogue-establishing utterance" refers to an utterance that does not include specific utterance contents (content words) such as nodding or filler. A text expressing the contents of the dialogue-establishing utterance is determined by the utterance determination part 3 arbitrarily selecting it from among fixed form sentences defined in advance and stored in a storage part (not shown) in the utterance determination part 3.

In step S13, the humanoid robot 5-2 outputs a voice expressing contents of a second utterance following the dialogue-establishing utterance from the speaker. Step S13 is executed after step S12. That is, the dialogue system 10 receives a user utterance, outputs the voice expressing contents of the dialogue-establishing utterance from the speaker, then outputs the voice expressing contents of the second utterance from the speaker. The "second utterance" is an utterance including contents associated with a generation target utterance. The "generation target utterance" refers to an utterance included in a dialogue performed between the humanoid robot and the user before the user utterance including at least the user utterance. That is, an example of the generation target utterance is a user utterance. Another example of the generation target utterance is two or more utterances including the user utterance and one or more utterances including an utterance determined by the utterance determination part 3 before the user utterance and presented by the presentation part 5-1 or 5-2 and an utterance performed by the user before the user utterance.

Regarding the text expressing contents of the second utterance, for example, words included in the generation target utterance are inputted to the utterance determination part 3 and the utterance determination part 3 determines the text according to a predetermined rule and based on the inputted words. As the technique for determining utterance contents in accordance with utterance contents of up to the immediately preceding utterance, techniques used in conventional dialogue systems, for example, a scenario dialogue system described in Non-patent literature 2 or an chat-oriented dialogue system described in Non-patent literature 3 or 4 can be used. When the utterance determination part 3 uses the technique used in the scenario dialogue system, the utterance determination part 3, for example, selects a scenario in which an inter-word distance between words included in each utterance or focus words constituting each utterance and words or focus words included in each scenario stored in a storage part (not shown) in the utterance determination part 3 is smaller than a predetermined distance regarding a dialogue including five immediately preceding utterances or so, selects a text included in the selected scenario and thereby determines the text expressing contents of the second utterance. When the utterance determination part 3 uses the technique used in the chat-oriented dialogue system, the utterance determination part 3 may, for example, use a word included in the user's utterance as a trigger and determine the text expressing contents of the second utterance according to a rule described in advance and stored in the storage part (not shown) in the utterance determination part 3 or may automatically generate a rule based on words in a co-occurrence relation or a dependency relation with words included in the user's utterance and determine the text expressing contents of the second utterance according to the rule.

An example has been described in the above embodiment where the humanoid robot 5-1 presents a dialogue-establishing utterance and the different humanoid robot 5-2 presents a second utterance. However, the humanoid robot that presents the dialogue-establishing utterance and the humanoid robot that presents the second utterance may be identical or a configuration may be adopted such that the humanoid robot 5-1 presents the dialogue-establishing utterance and the same humanoid robot 5-1 presents the second utterance in succession. Moreover, the humanoid robot that performs an utterance is not limited and a configuration may be adopted such that the humanoid robot 5-2 presents the dialogue-establishing utterance and the same humanoid robot 5-2 presents the second utterance in succession.

Hereinafter, a dialogue is continued between the user and the dialogue system 10 about the contents of the second utterance as a topic. For example, when the second utterance is generated using a technique used in the scenario dialogue system, the dialogue system 10 outputs from the speaker, a voice expressing utterance contents of the scenario utterance determined by the technique used in the scenario dialogue system so that a dialogue along the scenario selected by the technique used in the scenario dialogue system is performed between the user and the dialogue system 10. On the other hand, for example, when the second utterance is generated using the technique used in the chat-oriented dialogue system, the dialogue system 10 outputs a voice expressing utterance contents of an chat utterance determined by the technique used in the chat-oriented dialogue system based on the user's utterance from the speaker. The humanoid robot that presents subsequent utterances may be any one humanoid robot or a plurality of humanoid robots.

Hereinafter, a specific example of dialogue contents between the dialogue system 10 of the present embodiment and the user is shown. Here, "R" represents a humanoid robot and "H" represents a user. A number in parentheses after "R" is an identifier of the humanoid robot. "R(1→H)" means that the humanoid robot 5-1 talks to the user and "R(1→2)" means that the humanoid robot 5-1 talks to the humanoid robot 5-2. Note that to whom the humanoid robot intends to talk may be expressed by motion of the head or sight line of the humanoid robot or may not be expressed at all.

H: "My stomach is growling!"
R(1→H): "Wow" (*1)
R(2→H): "I'm hungry, so I want to eat Ramen" (*2)
*1 is a dialogue-establishing utterance. By only giving a nod ("Wow"), the robot shows that it understands the user's utterance. *2 is a second utterance. It gives a reply corresponding to "stomach" included in the user's utterance. Note that the utterance of the humanoid robot from *1 onward may be performed by the other humanoid robot or the dialogue partner may be a human or the other humanoid robot or both the human and the other humanoid robot.

Next, a specific example will be described where the same humanoid robot performs a dialogue-establishing utterance and a second utterance.

H: "It seems to be cold tomorrow, so I have to wear a coat."
R(1→H): "Wow, this year's coat fashion is the Chester coat." (*3)
*3 is an utterance composed of a dialogue-establishing utterance and a second utterance performed consecutively. After one humanoid robot gives a nod ("Wow"), an utterance in response to the "coat" included in the user's utterance is replied.

An example has been described in the above embodiment where the dialogue system 10 always presents a dialogue-establishing utterance and a second utterance to the user's utterance. However, a configuration may also be adopted in which the presentation part 5 of the dialogue system 10 presents a dialogue-establishing utterance and a second utterance when the dialogue system 10 is unable to generate any reply to the user utterance or when a reply to the user utterance determined by the dialogue system 10 has inappropriate contents, that is, only when an utterance candidate text generated in association with the text expressing contents of the generation target utterance does not meet a prescribed standard.

In this configuration, the utterance determination part 3 generates an utterance candidate text associated with a text expressing contents of a generation target utterance first. The utterance determination part 3 then decides whether or not the utterance candidate text meets a prescribed standard. When the utterance candidate text does not meet the prescribed standard, the utterance determination part 3 determines the text expressing contents of the dialogue-establishing utterance. Furthermore, when the utterance candidate text does not meet the prescribed standard, a text of an utterance associated with words which are fewer than words associated when the utterance candidate is generated of the text expressing contents of the generation target utterance is generated and the text of the generated utterance is assumed to be a text of the second utterance. As an example, operation of the utterance determination part 3 when the generation target utterance includes L words will be described. The utterance determination part 3 generates an utterance candidate text using M words of L words. Next, the utterance determination part 3 decides whether or not the utterance candidate text meets a prescribed standard. When the utterance candidate text does not meet the prescribed standard, the utterance determination part 3 outputs a text expressing contents of the dialogue-establishing utterance. Furthermore, when the utterance candidate text does not meet the prescribed standard, the utterance determination part 3 generates a text of an utterance using N words which are fewer than M words of the L words included in the text expressing contents of the generation target utterance and outputs the text of the utterance generated as the text of the second utterance. Here, suppose that N is an integer equal to or greater than 1 and M and L are integers equal to or greater than 2, satisfying a relationship $N<M\leq L$.

Furthermore, when, for example, it is not possible to generate a reply to the user utterance or when a reply to the user utterance does not have appropriate contents, that is, when the utterance candidate text generated in association with the text expressing contents of the generation target utterance does not meet the prescribed standard, the utterance determination part 3 may be configured to establish a dialogue using a dialogue-establishing utterance such as nodding and then output even an utterance candidate which does not meet the prescribed standard as a second utterance as is. In this configuration, for example, the utterance determination section 3 generates an utterance candidate text associated with the text expressing contents of the generation target utterance. The utterance determination part 3 then decides whether or not the utterance candidate text meets the prescribed standard. When the utterance candidate text does not meet the prescribed standard, the utterance determination part 3 determines the text expressing contents of the dialogue-establishing utterance. Furthermore, when the utterance candidate text does not meet the prescribed standard, the utterance determination section 3 outputs the utterance candidate text as a text of the second utterance as is. The utterance determination part 3 then decides whether or not the utterance candidate text meets the prescribed standard. When the utterance candidate text does not meet the prescribed standard, the utterance determination part 3 determines the text expressing contents of the dialogue-establishing utterance.

Furthermore, an utterance including at least part of the user utterance such as an utterance composed of part or a whole of the user utterance may be assumed as a dialogue-establishing utterance. That is, the dialogue system may be configured such that the utterance determination part 3 determines an utterance including at least part of the text expressing contents of the user utterance as the text of the dialogue-establishing utterance. A specific example of the dialogue contents between the dialogue system and the user in this configuration will be shown.

H: "The Tonkotsu Ramen that I ate in Hakata was really delicious!"

R(1→H): "Ramen" (*1)

R(2→H): "I'm hungry so I want to eat Ramen" (*2)

*1 is a dialogue-establishing utterance and *2 is a second utterance. In this specific example, the dialogue system presents only a word ("Ramen") included in the user utterance as a dialogue-establishing utterance, thereby shows that it understands the user's utterance, and then presents a reply corresponding to "Ramen" included in the user utterance as a second utterance. That is, in this specific example, the utterance determination part 3 determines one word included in the text expressing contents of the user utterance as the text of the dialogue-establishing utterance.

Another specific example of the dialogue contents between the dialogue system and the user in this configuration will be described.

H: "The Tonkotsu Ramen that I ate in Hakata was really delicious!"

R(1→H): "Tonkotsu Ramen is delicious" (*1)

R(2→H): "I'm hungry so I want to eat Ramen" (*2)

*1 is a dialogue-establishing utterance and *2 is a second utterance. In this specific example, the dialogue system presents an utterance which includes some content words ("Tonkotsu Ramen" and "delicious") included in the text of the user utterance and agrees with the user's utterance as a dialogue-establishing utterance, thereby shows that it understands the user's utterance and then presents the reply corresponding to "Ramen" included in the user's utterance as the second utterance. That is, in this specific example, the utterance determination part 3 includes an utterance including some words included in the text expressing contents of the user utterance, or more specifically, some content words included in the text of the user's utterance, and determines the utterance that agrees with the user's utterance as the text of the dialogue-establishing utterance.

Another specific example of dialogue contents between the dialogue system and the user in this configuration will be described.

H: "The Tonkotsu Ramen that I ate in Hakata was really delicious!"

R(1→H): "You ate it in Hakata" (*1)

R(2→H): "I'm hungry so I want to eat Ramen" (*2)

*1 is a dialogue-establishing utterance and *2 is a second utterance. In this specific example, the dialogue system includes some content words ("Hakata" and "eat") included in the text of the user's utterance and presents an utterance that agrees with the user's utterance as the dialogue-establishing utterance showing that it understands the user's utterance, and presents a reply corresponding to "Ramen" included in the user's utterance as the second utterance. That is, in this specific example, the utterance determination part 3 includes an utterance including some words included in the text expressing contents of the user utterance, or more specifically, some content words included in the text of the user's utterance and determines the utterance that agrees with the user's utterance as the text of the dialogue-establishing utterance.

Note that although an example has been described in the above specific example where an utterance including at least part of the user utterance is used as a dialogue-establishing utterance, an utterance obtained by replacing a word included in an utterance including at least part of the user utterance with a hypernym, that is, an utterance including a hypernym of part of the user utterance may be assumed as the dialogue-establishing utterance. In this case, for example, the utterance determination part 3 acquires a hypernym of at least some words of the text expressing contents of the user utterance, obtains the text of an utterance sentence including the hypernym and determines the text of the utterance sentence obtained as the text of the dialogue-establishing utterance.

As described in the above specific examples, in short, the dialogue-establishing utterance in the present configuration is an utterance that substantially repeats part or a whole of the user utterance so as to cause the user to feel that the dialogue system has received the user's utterance, that is, an utterance with which the user can readily agree. Note that when many words are included in the user utterance, by causing the dialogue-establishing utterance to become an utterance that substantially repeats part of the user utterance without including the whole user utterance, the dialogue-establishing utterance can become an utterance with which the user can readily agree and the dialogue system can perform an utterance with an amount of information reduced to an extent that prevents the user from feeling that the dialogue system just repeats the user utterance like a parrot. Note that when the user utterance is sufficiently short, even when the dialogue system simply repeats the user utterance or utters a hypernym of the user utterance, that is, even when the dialogue system substantially repeats the whole user utterance, the amount of information to be presented is small and so the user does not regard it as a repetition like a parrot.

The text expressing contents of the dialogue-establishing utterance is determined by the utterance determination part 3 arbitrarily selecting a text from among fixed form sentences stored in advance in the storage part (not shown) in the utterance determination part 3. Note that an utterance including an utterance that does not include content words such as nodding or a filler and an utterance including at least part of the user utterance may be assumed as a dialogue-establishing utterance.

Note that in a configuration in which the dialogue system 10 includes a plurality of humanoid robots, when a user utterance is an utterance in response to an utterance of a humanoid robot, a configuration may be adopted in which none of the humanoid robots presents any dialogue-establishing utterance and a humanoid robot different from the humanoid robot that gives an utterance which becomes the origin of the user utterance presents a second utterance. For example, in a configuration in which the dialogue system 10 includes the humanoid robots 5-1 and 5-2, if the user utterance is an utterance in response to the utterance of the humanoid robot 5-1, a configuration may also be adopted in which neither the humanoid robot 5-1 nor the humanoid robot 5-2 presents any dialogue-establishing utterance, and the humanoid robot 5-2 presents the second utterance. When this configuration is adopted, the utterance determination part 3 needs only to determine the text of the second utterance, but need not determine the text of any dialogue-establishing utterance.

A prescribed standard for deciding whether or not the utterance candidate text is appropriate is that, for example, none of 1. Mismatch between user utterance and cont-ext, 2. Lack of common-sense knowledge or 3. Mismatch in the tense and facticity is applicable. Hereinafter, the respective standards will be described in detail using specific examples.

1. The mismatch between the user utterance and the context refers to a case where the utterance candidate text generated based on the text expressing contents of a generation target utterance does not match the context of the text of the user utterance. A specific example of mismatch between the user utterance and the context is shown below.

H: "It seems to be cold tomorrow, so I have to wear a coat."

R(1→H): "This year's coat fashion is the Chester coat."

In this example, the user talks about the "reason for wearing a coat" whereas the robot talks about the "fashion of coat" showing that both do not match in context. As a specific decision method, the utterance determination part 3 makes a determination by evaluating the continuity of topics between the text of the user utterance and the generated utterance candidate text using words (including parts of utterance other than nouns) noun phrases, predicate item structure inclusive as units. For example, when an index value of the continuity of topics is lower in the continuity of topics than a threshold stored in advance in the storage part (not shown) in the utterance determination part 3, the utterance determination part 3 decides that the utterance candidate text does not match the context of the user utterance. To evaluate the continuity of topics, it is possible to use a distance between words constituting a topic or a publicly known dialogue failure detection technique (e.g., see Reference document 1).

[Reference Literature 1]: Hiroaki Sugiyama, "Chat-oriented Dialogue Breakdown Detection based on Combination of Various Data" Sixth dialogue system symposium (SIG-SLUD), The Japanese Society for Artificial Intelligence, pp. 51-56, 2015

2. Lack of common-sense knowledge is a case where the utterance candidate text generated based on the text expressing contents of a generation target utterance is, for example, a question on a common-sense item, giving an impression that common-sense knowledge is lacking. In such a case, the user loses reliability for the dialogue system, and so the user may stop the dialogue. Specific examples of the lack of common-sense knowledge are shown below.

H: "It seems to be cold tomorrow, so I have to wear a coat."

R(1→H): "You wear a coat when it is cold, don't you?"

In this example, the robot questions about a common-sense matter for humans that "humans wear coats when it is cold", giving an impression that the robot lacks common-sense knowledge. As a specific decision method, the utterance determination part 3 searches for a combination of focus words constituting utterance candidate texts (in the above example, "cold", "coat" and "wear") from a large volume of texts collected in advance and stored in the storage part (not shown) in the utterance determination part 3 and if the number of occurrences thereof is larger than a threshold stored in advance in the storage part (not shown) in the utterance determination part 3 and the utterance candidate text has contents with an intention of confirmation of the partner, the utterance determination part 3 determines that the utterance candidate text lacks common-sense knowledge. The texts collected in advance and stored in the storage part (not shown) in the utterance determination part 3 to search for focus words may be collected from Web sites such as Twitter (registered trademark).

3. Mismatch in tense and facticity refers to a case where the text of the user utterance and the generated utterance candidate text do not match in tense and facticity. Specific examples of mismatch in tense and facticity are shown below.

H: "It was cold yesterday, so I picked up a down coat."

R(1→H): "Do you want to pick up a down coat?"

In this example, the user talked about an event in the past that the user "picked up a down coat" but the robot is asking about a desire for occurrence of a completed event asking "Do you want to pick up a down coat?" which matches neither in tense nor in facticity. As a specific decision method, when the user utterance text differs from the generated utterance candidate text in the tense and facticity of an event in the utterance expressed in a predicate item structure, or when the texts do not abide by a predetermined rule, the utterance determination part 3 determines it as a mismatch in tense and facticity.

Modification

An example has been described in the aforementioned embodiment where robots are used as agents and a dialogue using voices is performed. However, the robots in the aforementioned embodiment may be humanoid robots having physical bodies or the like or robots without physical bodies or the like. The dialogue technique of the invention is not limited to the above-described techniques, but may be a mode in which a dialogue is performed using agents without any entity like a physical body such as a humanoid robot, not provided with any utterance mechanism. One such example may be a mode in which a dialogue is performed using an agent displayed on a screen of a computer. More specifically, in group chats in which a plurality of accounts perform dialogues using text messages such as "LINE" and "2-channel" (registered trademarks), the present dialogue system is applicable to a mode in which a dialogue is performed between the user's account and an account of a dialogue apparatus. In this mode, the computer having a screen for displaying agents needs to be located in the vicinity of a human, but the computer and the dialogue apparatus may be connected together via a network such as the Internet. That is, the present dialogue system is applicable not only to a dialogue in which speakers such as a human and a robot actually speak face to face, but also to a dialogue in which speakers communicate with each other through a network.

Figure 3:
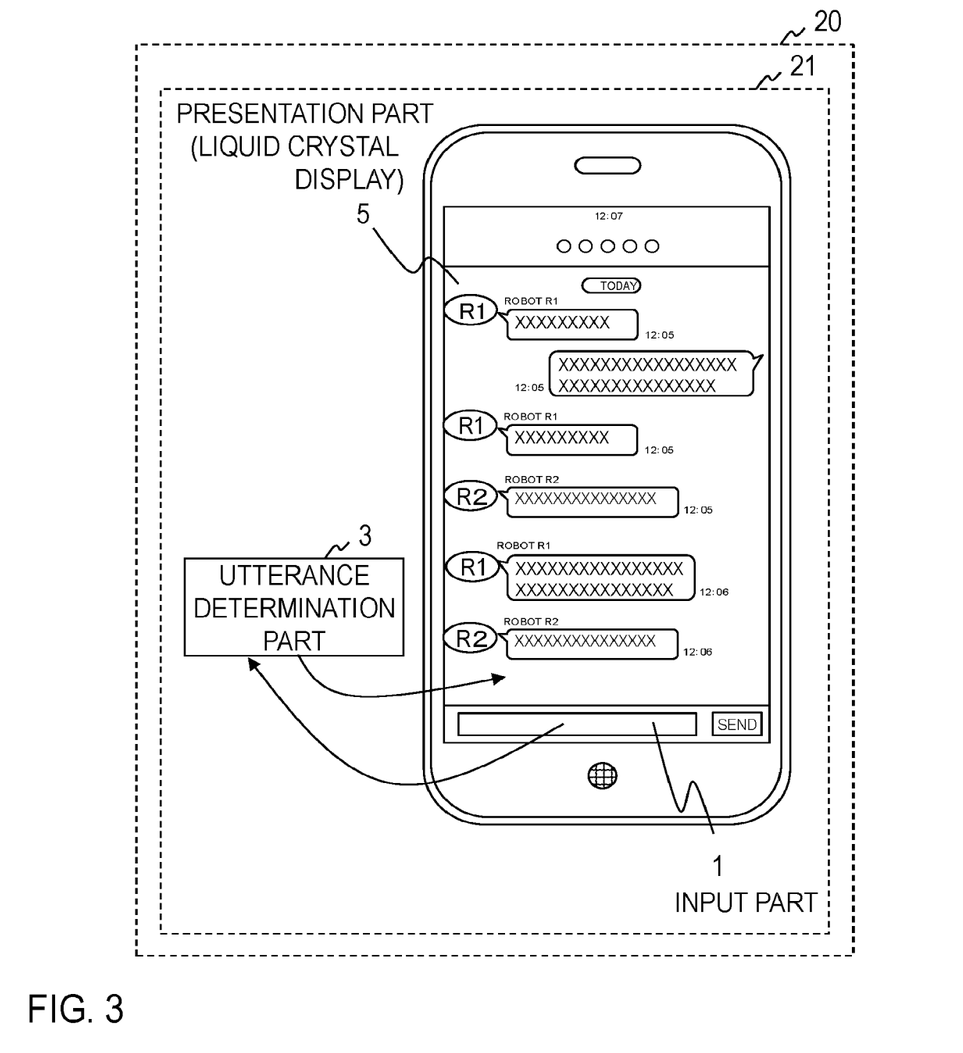
FIG. 3 is a diagram illustrating a functional configuration of a dialogue system using a group chat.

As shown in FIG. 3, a dialogue system 20 according to a modification is provided with an input part 1, an utterance determination part 3 and a presentation part 5. In the example in FIG. 3, the dialogue system 20 of the modification is constructed of one dialogue apparatus 21 and the dialogue apparatus 21 of the modification is provided with the input part 1, the utterance determination part 3 and the presentation part 5.

Examples of the dialogue apparatus according to the modification include a mobile terminal such as a smartphone and a tablet or an information processing apparatus such as a desktop or lap top personal computer. The following description is given assuming that the dialogue apparatus is a smartphone. The presentation part 5 is a liquid crystal display provided for the smartphone. A window of chat application is displayed on this liquid crystal display and dialogue contents of the group chat are displayed in the window in time-series order. The "group chat" is a function whereby a plurality of accounts in a chat mutually contribute text messages and develop a dialogue. Suppose a plurality of virtual accounts corresponding to virtual characters controlled by the dialogue apparatus and the user's account participate in this group chat. That is, the present modification is an example of a case where the agent is a virtual account displayed on the liquid crystal display of the smartphone which is the dialogue apparatus. The user enters utterance contents into the input part 1 using a software keyboard and can contribute the utterance contents to the group chat through the own account. The utterance determination part 3 determines utterance contents from the dialogue apparatus based on the contribution from the user's account and contributes the utterance contents to the group chat through each virtual account. Note that a configuration may also be adopted in which the user inputs utterance contents to the input part 1 with voices using the microphone and the voice recognition function mounted on the smartphone. A configuration may also be adopted in which the user inputs utterance contents to the input part 1 in handwriting using the touch panel and the voice recognition function mounted on the smartphone. A configuration may also be adopted in which the user outputs utterance contents obtained from each dialogue system with voices from the speaker corresponding to each virtual account using the speaker and the voice synthesis function mounted on the smartphone.

Note that when utterances of the agents are displayed on the presentation part 5 (display) simultaneously, the user may perceive uncomfortable feeling, and so the utterances are preferably displayed one by one. Furthermore, the recognition result of the user's utterance may also be displayed on the presentation part 5 (display).

According to the dialogue technique of the present invention configured as described above, utterances are performed in a way a dialogue is more likely to be established regardless of contents of the user's utterance, and so it is possible to reduce uncomfortable feeling given to the user and allow the user to continue a dialogue with the dialogue apparatus for a long time.

The embodiments of the present invention have been described so far, but the specific configuration thereof is not limited to the above-described embodiments, and it goes without saying that even when there are changes or the like in the design in an appropriate fashion without departing from the spirit and scope of the present invention, such changes are included in the present invention. The various processes described in the embodiments may not only be executed in time-series order according to the order of the description, but also be executed in parallel or individually according to a processing capability of the apparatus that executes the processes or as required.

[Program, Recording Medium]

When the various processing functions of the dialogue apparatus described in the above-described embodiments are implemented by a computer, processing contents of the functions that should be possessed by the dialogue apparatus are described by a program. Furthermore, when the various processing functions of the dialogue system described in the above-described modifications are implemented by a computer, processing contents of the functions that should be possessed by the dialogue system are described by a program. The various processing functions of the dialogue apparatus and the dialogue system are implemented on the computer by the computer executing this program.

The program that describes the processing contents can be recorded in a computer-readable recording medium. Examples of the computer-readable recording medium include a magnetic recording apparatus, an optical disk, a magneto-optical recording medium, a semiconductor memory or any medium.

This program is circulated through sales, transfer or rent of a portable recording medium such as DVD, CD-ROM that records the program. The program may also be circulated by storing the program in a storage apparatus of a server computer, and transferring the program from the server computer to another computer through a network.

The computer that executes such a program stores a program recorded in a portable storage medium or a program transferred from the server computer in the own storage part. At the time of execution of the process, this computer reads the program stored in the own storage part and executes the process according to the read program. As another embodiment of the program, the computer may read the program directly from a portable recording medium and may execute the process according to the program. Furthermore, every time the program is transferred to the computer from the server computer, the process may be executed successively according to the received program. The above-described process may be executed by a so-called ASP (Application Service Provider) type service in which without the server computer transferring the program to the computer, the processing function is implemented only by instructing execution and acquiring the result. Note that the program in this mode includes a semi-program which is information used for processing by a computer (data which is not a direct instruction on the computer but has a characteristic of defining processing of the computer).

Although the present apparatus is configured by executing a predetermined program on the computer, at least some of these processing contents may be implemented by hardware.

What is claimed is:

1. A dialogue method carried out by a dialogue system that performs a dialogue with a user, the dialogue method comprising:

an utterance receiving step in which an input part receives a user utterance performed by the user, a first presentation step in which a presentation part presents a dialogue-establishing utterance, wherein the dialogue-establishing utterance is presented to the user utterance, the dialogue-establishing utterance is a nodding, and no utterances are presented between the user utterance and the dialogue-establishing utterance; and a second presentation step in which the presentation part presents, after the dialogue-establishing utterance, a second utterance which is an utterance determined with a predetermined rule that considers words included in a generation target utterance, wherein the generation target utterance is one of (i) the user utterance and (ii)

the user utterance and one or more utterances performed before the user utterance, and no utterances are presented between the dialogue-establishing utterance and the second utterance, wherein the first presentation step and the second presentation step are executed where an utterance candidate generated in association with the generation target utterance does not meet a prescribed standard, wherein the prescribed standard is whether or not the utterance candidate has inappropriate contents as a reply to the user utterance, the generation target utterance includes L words, the utterance candidate is generated using M words included in the L words, and the second utterance is generated using N words included in the L words, where N is an integer equal to or greater than 1, M and L are integers equal to or greater than 2, and N<M≤L.

2. A dialogue method carried out by a dialogue system that performs a dialogue with a user, the dialogue method comprising:

an utterance receiving step in which an input part receives a user utterance performed by the user;

a first presentation step in which a presentation part presents a dialogue-establishing utterance, wherein the dialogue-establishing utterance is presented to the user utterance, the dialogue-establishing utterance is a nodding, and no utterances are presented between the user utterance and the dialogue-establishing utterance; and a second presentation step in which the presentation part presents, after the dialogue-establishing utterance, a second utterance which is an utterance determined with a predetermined rule that considers words included in a generation target utterance, wherein the generation target utterance is one of (i) the user utterance and (ii) the user utterance and one or more utterances performed before the user utterance, and no utterances are presented between the dialogue-establishing utterance and the second utterance, wherein the first presentation step and the second presentation step are executed where an utterance candidate generated in association with the generation target utterance does not meet a prescribed standard, wherein the prescribed standard is whether or not the utterance candidate has inappropriate contents as a reply to the user utterance, the second utterance is the utterance candidate that does not meet the prescribed standard.

3. The dialogue method according to claim 1 or 2, wherein the dialogue system comprises a plurality of agents, in the first presentation step, any one agent of the plurality of agents presents the dialogue-establishing utterance, in the second presentation step, an agent different from the agent presenting the dialogue-establishing utterance of the plurality of agents presents the second utterance.

4. A dialogue system that performs a dialogue with a user, the dialogue system comprising:

an input part that receives a user utterance performed by the user;

an utterance determination part that determines a dialogue-establishing utterance and a second utterance which is an utterance determined with a predetermined rule that considers words included in a generation target utterance, wherein the dialogue-establishing utterance is presented to the user utterance, the dialogue-establishing utterance is a nodding, and the generation target utterance is one of (i) the user utterance and (ii) the user utterance and one or more utterances performed before the user utterance; and a presentation part that presents the dialogue-establishing utterance determined by the utterance determination part and presents the second utterance determined by the utterance determination part immediately after presenting the dialogue-establishing utterance, wherein no utterances are presented both between the user utterance and the dialogue-establishing utterance and between the dialogue-establishing utterance and the second utterance wherein the presentation part presents the dialogue-establishing utterance and the second utterance where an utterance candidate generated in association with the generation target utterance does not meet a prescribed standard, wherein the prescribed standard is whether or not the utterance candidate has inappropriate contents as a reply to the user utterance, the generation target utterance includes L words, the utterance candidate is generated using M words included in the L words, and the second utterance is generated using N words included in the L words, where N is an integer equal to or greater than 1, M and L are integers equal to or greater than 2, and N<M≤L.

5. A dialogue apparatus that determines an utterance presented by a dialogue system comprising at least an input part that receives a user utterance which is an utterance from a user and a presentation part that presents an utterance, the dialogue apparatus comprising processing circuitry configured to:

determine a dialogue-establishing utterance, wherein the dialogue-establishing utterance is presented to the user utterance, the dialogue-establishing utterance is a nodding, and no utterances are presented between the user utterance and the dialogue-establishing utterance; and determine a second utterance which is an utterance presented after the dialogue-establishing utterance and is an utterance determined with a predetermined rule that considers words included in a generation target utterance, wherein the generation target utterance is one of (i) the user utterance and (ii) the user utterance and one or more utterances performed before the user utterance, and no utterances are presented between the dialogue-establishing utterance and the second utterance wherein the dialogue-establishing utterance and the second utterance are presented where an utterance candidate generated in association with the generation target utterance does not meet a prescribed standard, wherein the prescribed standard is whether or not the utterance candidate has inappropriate contents as a reply to the user utterance, the generation target utterance includes L words, the utterance candidate is generated using M words included in the L words, and the second utterance is generated using N words included in the L words, where N is an integer equal to or greater than 1, M and L are integers equal to or greater than 2, and N<M≤L.

6. A non-transitory computer readable recording medium including computer executable instructions that make a dialogue system perform a dialogue method, wherein the dialogue system performs a dialogue with a user, the dialogue method comprising:

an utterance receiving step in which an input part receives a user utterance performed by the user;

a first presentation step in which a presentation part presents a dialogue-establishing utterance, wherein the dialogue-establishing utterance is presented to the user utterance, the dialogue-establishing utterance is a nodding, and no utterances are presented between the user utterance and the dialogue-establishing utterance; and a second presentation step in which the presentation part presents, after the dialogue-establishing utterance, a second utterance which is an utterance determined with a predetermined rule that considers words included in a generation target utterance, wherein the generation target utterance is one of (i) the user utterance and (ii) the user utterance and one or more utterances performed before the user utterance, and no utterances are presented between the dialogue-establishing utterance and the second utterance, wherein the first presentation step and the second presentation step are executed where an utterance candidate generated in association with the generation target utterance does not meet a prescribed standard, wherein the prescribed standard is whether or not the utterance candidate has inappropriate contents as a reply to the user utterance, the generation target utterance includes L words, the utterance candidate is generated using M words included in the L words, and the second utterance is generated using N words included in the L words, where N is an integer equal to or greater than 1, M and L are integers equal to or greater than 2, and N<M≤L.

7. A non-transitory computer readable recording medium including computer executable instructions that make a dialogue apparatus perform a method, wherein the dialogue apparatus determines an utterance presented by a dialogue system comprising at least an input part that receives a user utterance which is an utterance from a user and a presentation part that presents an utterance, the method comprising:

determining, by processing circuitry of the dialogue apparatus, a dialogue-establishing utterance, wherein the dialogue-establishing utterance is presented to the user utterance, the dialogue-establishing utterance is a nodding, and no utterances are presented between the user utterance and the dialogue-establishing utterance; and determining, by the processing circuitry of the dialogue apparatus, a second utterance which is an utterance presented after the dialogue-establishing utterance and is an utterance determined with a predetermined rule that considers words included in a generation target utterance, wherein the generation target utterance is one of (i) the user utterance and (ii) the user utterance and one or more utterances performed before the user utterance, and no utterances are presented between the dialogue-establishing utterance and the second utterance wherein the dialogue-establishing utterance and the second utterance are presented where an utterance candidate generated in association with the generation target utterance does not meet a prescribed standard, wherein the prescribed standard is whether or not the utterance candidate has inappropriate contents as a reply to the user utterance, the generation target utterance includes L words, the utterance candidate is generated using M words included in the L words, and the second utterance is generated using N words included in the L words, where N is an integer equal to or greater than 1, M and L are integers equal to or greater than 2, and N<M≤L.

8. A dialogue system that performs a dialogue with a user, the dialogue system comprising:

an input part that receives a user utterance performed by the user;

an utterance determination part that determines a dialogue-establishing utterance and a second utterance which is an utterance determined with a predetermined rule that considers words included in a generation target utterance, wherein the dialogue-establishing utterance is presented to the user utterance, the dialogue-establishing utterance is a nodding, and the generation target utterance is one of (i) the user utterance and (ii) the user utterance and one or more utterances performed before the user utterance; and a presentation part that presents the dialogue-establishing utterance determined by the utterance determination part and presents the second utterance determined by the utterance determination part immediately after presenting the dialogue-establishing utterance, wherein no utterances are presented both between the user utterance and the dialogue-establishing utterance and between the dialogue-establishing utterance and the second utterance wherein the presentation part presents the dialogue-establishing utterance and the second utterance where an utterance candidate generated in association with the generation target utterance does not meet a prescribed standard, wherein the prescribed standard is whether or not the utterance candidate has inappropriate contents as a reply to the user utterance, the second utterance is the utterance candidate that does not meet the prescribed standard.

9. A non-transitory computer readable recording medium on which a program for causing a computer to function as the dialogue system according to claim 8 is recorded.

10. A dialogue apparatus that determines an utterance presented by a dialogue system comprising at least an input part that receives a user utterance which is an utterance from a user and a presentation part that presents an utterance, the dialogue apparatus comprising processing circuitry configured to:

determine a dialogue-establishing utterance, wherein the dialogue-establishing utterance is presented to the user utterance, the dialogue-establishing utterance is a nodding, and no utterances are presented between the user utterance and the dialogue-establishing utterance; and determine a second utterance which is an utterance presented after the dialogue-establishing utterance and is an utterance determined with a predetermined rule that considers words included in a generation target utterance, wherein the generation target utterance is one of (i) the user utterance and (ii) the user utterance and one or more utterances performed before the user utterance, and no utterances are presented between the dialogue-establishing utterance and the second utterance wherein the dialogue-establishing utterance and the second utterance are presented where an utterance candidate generated in association with the generation target utterance does not meet a prescribed standard, wherein the prescribed standard is whether or not the utterance candidate has inappropriate contents as a reply to the user utterance, the second utterance is the utterance candidate that does not meet the prescribed standard.

11. A non-transitory computer readable recording medium on which a program for causing a computer to function as the dialogue apparatus according to claim 10 is recorded.

\* \* \* \* \*